US011343515B2

United States Patent
Oikawa et al.

(10) Patent No.: US 11,343,515 B2
(45) Date of Patent: May 24, 2022

(54) IMAGE PROCESSING APPARATUS, IMAGE PROCESSING METHOD, AND RECORDING MEDIUM

(71) Applicant: FUJITSU LIMITED, Kawasaki (JP)

(72) Inventors: Koichi Oikawa, Kawasaki (JP); Hideyuki Kikuchi, Chigasaki (JP); Yusuke Nakanishi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 191 days.

(21) Appl. No.: 16/749,194

(22) Filed: Jan. 22, 2020

(65) Prior Publication Data

US 2020/0252633 A1 Aug. 6, 2020

(30) Foreign Application Priority Data

Jan. 31, 2019 (JP) .............................. JP2019-016156

(51) Int. Cl.

| | |
|---|---|
| *H04N 19/167* | (2014.01) |
| *H04N 19/90* | (2014.01) |
| *H04N 19/182* | (2014.01) |
| *H04N 19/186* | (2014.01) |

(52) U.S. Cl.
CPC ......... *H04N 19/186* (2014.11); *H04N 19/167* (2014.11); *H04N 19/182* (2014.11); *H04N 19/90* (2014.11)

(58) Field of Classification Search
CPC .... H04N 19/167; H04N 19/70; H04N 19/182; H04N 19/186; H04N 19/90; H04N 1/644
See application file for complete search history.

(56) References Cited

U.S. PATENT DOCUMENTS

| | | | |
|---|---|---|---|
| 5,883,678 A * | 3/1999 | Yamaguchi | H04N 19/29 375/E7.081 |
| 6,031,974 A | 2/2000 | Takahashi et al. | |
| 2005/0226500 A1* | 10/2005 | Sasaki | H04N 11/046 382/238 |

(Continued)

FOREIGN PATENT DOCUMENTS

| | | |
|---|---|---|
| JP | 63-92185 | 4/1988 |
| JP | 07-312696 | 11/1995 |

(Continued)

*Primary Examiner* — Zaihan Jiang
(74) *Attorney, Agent, or Firm* — Fujitsu Patent Center

(57) ABSTRACT

A computer-readable recording medium storing a program that causes a computer to execute a process, the process includes specifying occurrence frequencies of respective gradation values with regard to pixels included in image data and represented by gradation values of a predetermined bit count; extracting a predetermined number of gradation values from a gradation value having a high occurrence frequency in a descending order; generating correspondence information for performing bit conversion of the extracted gradation values into coded values of a bit count in accordance with the predetermined number; and encoding the image data by performing bit conversion of first pixels having any one of the predetermined number of gradation values among the pixels based on the correspondence information, and performing bit conversion of second pixels having any one of gradation values other than the predetermined number of gradation values among the pixels.

5 Claims, 14 Drawing Sheets

(56) References Cited

U.S. PATENT DOCUMENTS

| | | | |
|---|---|---|---|
| 2006/0158691 A1* | 7/2006 | Kakutani | H04N 1/40087 358/3.01 |
| 2008/0253684 A1* | 10/2008 | Watanabe | G06T 5/008 382/276 |
| 2011/0064323 A1* | 3/2011 | Kurigata | H04N 19/176 382/233 |
| 2011/0141134 A1* | 6/2011 | Sasaki | H04N 1/642 345/600 |
| 2015/0112642 A1* | 4/2015 | Tonder | G01R 13/029 702/189 |
| 2017/0213346 A1* | 7/2017 | Kawamoto | G06T 7/13 |
| 2017/0318190 A1* | 11/2017 | Yoshii | H04N 1/6005 |
| 2018/0096640 A1* | 4/2018 | Tada | G09G 5/10 |
| 2019/0005864 A1* | 1/2019 | Ozaki | G09G 3/2059 |
| 2019/0220714 A1* | 7/2019 | Kakutani | H04N 1/58 |
| 2019/0228198 A1* | 7/2019 | Miyoshino | G06T 7/90 |
| 2019/0266486 A1* | 8/2019 | Yamada | G06V 10/44 |
| 2019/0283440 A1* | 9/2019 | Yokouchi | H04N 1/2346 |
| 2020/0008153 A1* | 1/2020 | Yi | H04W 52/0261 |
| 2020/0134403 A1* | 4/2020 | Kato | G06K 15/188 |

FOREIGN PATENT DOCUMENTS

| | | |
|---|---|---|
| JP | 2002-300407 | 10/2002 |
| JP | 2003-091722 | 3/2003 |

* cited by examiner

IMAGE PROCESSING APPARATUS, IMAGE PROCESSING METHOD, AND RECORDING MEDIUM

CROSS-REFERENCE TO RELATED APPLICATION

This application is based upon and claims the benefit of priority of the prior Japanese Patent Application No. 2019-16156, filed on Jan. 31, 2019, the entire contents of which are incorporated herein by reference.

FIELD

The embodiments discussed herein are related to an image processing technology.

BACKGROUND

Up to now, in an inspection on a structure such as a bridge beam, an inspecting trader performs an inspection by way of short range visual observation, and photographing damaged portions by an imaging apparatus to accumulate image data. In recent years, a technology has been developed with which a drone to which an imaging apparatus is mounted is operated to fly, and image data obtained by photographing is analyzed to determine the presence or absence of a damage of a structure or the like. Since the data amount of the image data obtained by the photographing in the inspection on the structure such as the bridge beam is very high, it is desired that low-capacity is generated by compression processing when the data is saved.

Various compression methods for the image data have been proposed, and it is conceivable to apply a compression method based on occurrence frequencies of gradation values to a structure having a uniform color tone such as a bridge beam, for example, as illustrated in the following patent literatures.

Related art is disclosed in, for example, Japanese Laid-open Patent Publication Nos. 2003-91722, 2002-300407, and 63-92185.

SUMMARY

According to an aspect of the embodiments, a non-transitory computer-readable recording medium storing a program that causes a computer to execute a process, the process includes specifying occurrence frequencies of respective gradation values with regard to a plurality of pixels included in image data and represented by gradation values of a predetermined bit count; extracting a predetermined number of gradation values from a gradation value having a high occurrence frequency in a descending order; generating correspondence information for performing bit conversion of the extracted gradation values into coded values of a bit count in accordance with the predetermined number; and encoding the image data by performing bit conversion of first pixels having any one of the predetermined number of gradation values among the plurality of pixels based on the correspondence information, and performing bit conversion of second pixels having any one of gradation values other than the predetermined number of gradation values among the plurality of pixels.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

According to a related art technology, there are cases where the technology is not appropriate to determine the presence or absence of a damage of a structure or the like because this is not lossless compression, and where data amount reduction efficiency is not sufficient because conversion into a predetermined coded value is performed, and low-capacity data is not to be generated.

Hereinafter, respective embodiments are described with reference to the accompanying drawings. In the present specification and drawings, components having substantially the same functional configurations are assigned with the same reference signs, and duplicated description is omitted.

Figure 1:
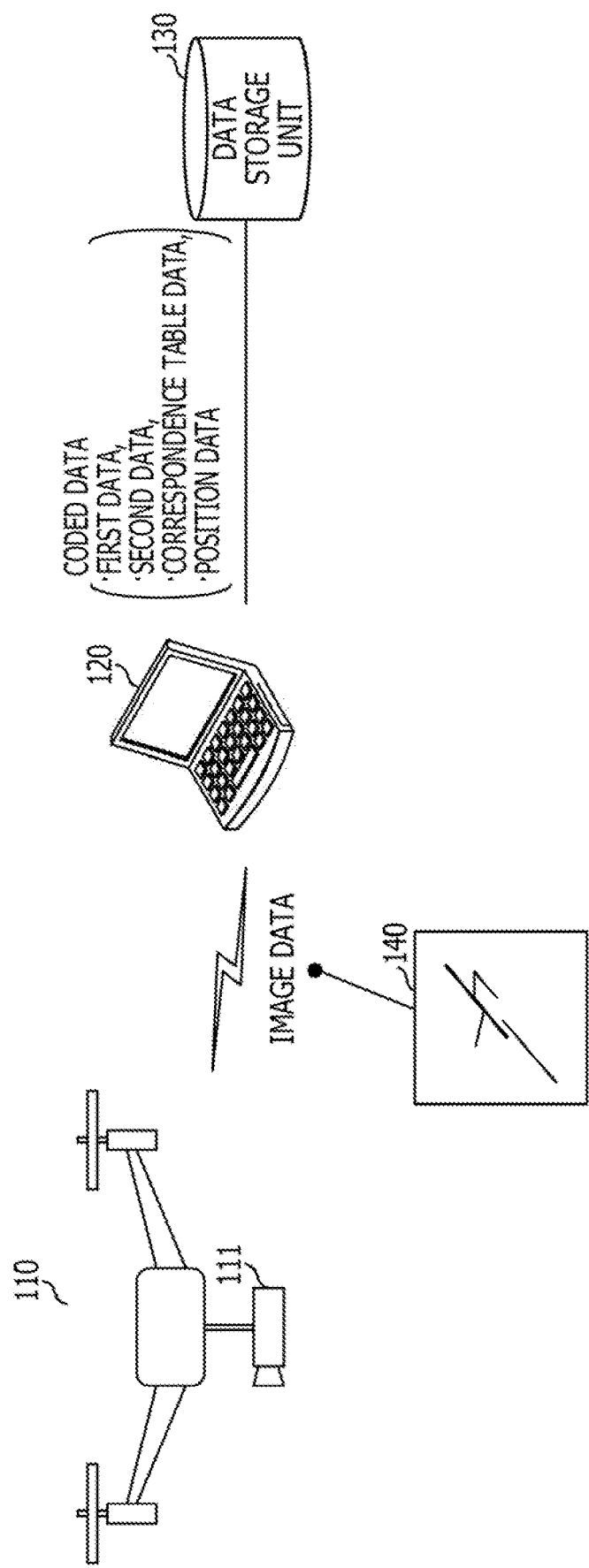
FIG. 1 is a diagram illustrating one example of a system configuration of an image data collection system.

Description is provided for a system configuration of an image data collection system including an image processing apparatus according to a first embodiment. FIG. 1 is a diagram illustrating one example of the system configuration of the image data collection system. As illustrated in FIG. 1, the image data collection system 100 includes a drone 110, an image processing apparatus 120, and a data storage unit 130.

An imaging device 111 is mounted to the drone 110, and the drone is operated to fly along a structure such as a bridge beam and perform photographing of the structure. Image data photographed by the imaging device 111 when the drone flies along the structure such as the bridge beam is transmitted to the image processing apparatus 120.

The image processing apparatus 120 receives the image data transmitted by the imaging device 111 (for example, image data 140). The image processing apparatus 120 encodes the received image data and stores the generated coded data in the data storage unit 130. The coded data generated by the image processing apparatus 120 includes first data, second data, correspondence table data, and position data (detail is described below).

In this manner, in accordance with the image processing apparatus 120, low-capacity lossless compression data (coded data) may be generated from the image data and stored in the data storage unit 130.

The data storage unit 130 stores the coded data generated in the image processing apparatus 120 (the first data, the second data, the correspondence table data, and the position data). The image processing apparatus 120 is configured to execute decoding processing for decoding the coded data stored in the data storage unit 130 into the original image data as appropriate.

Figure 2:
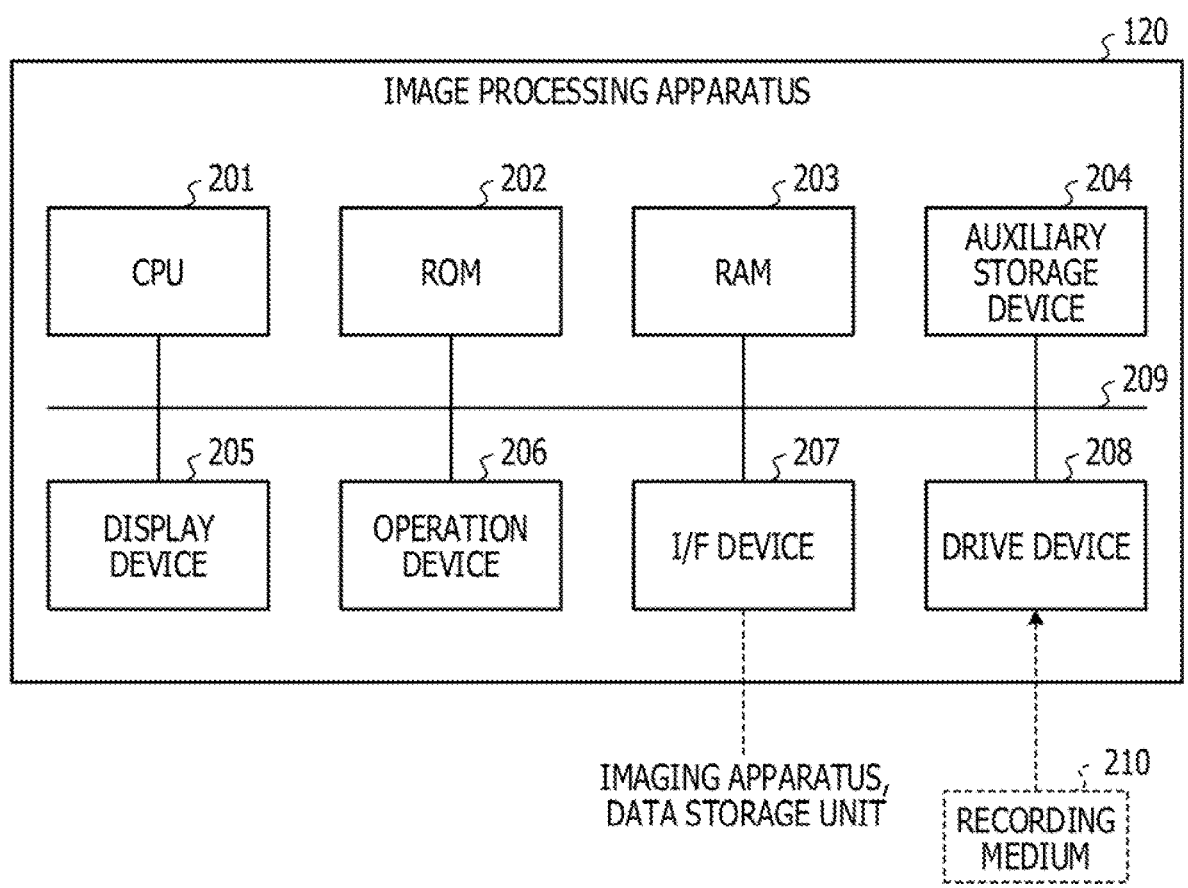
FIG. 2 is a diagram illustrating one example of a hardware configuration of an image processing apparatus.

Next, a hardware configuration of the image processing apparatus 120 is described. FIG. 2 is a diagram illustrating one example of the hardware configuration of the image processing apparatus. As illustrated in FIG. 2, the image processing apparatus 120 includes a central processing unit (CPU) 201, a read-only memory (ROM) 202, and a random-access memory (RAM) 203. The CPU 201, the ROM 202, and the RAM 203 form a so-called computer.

The image processing apparatus 120 further includes an auxiliary storage device 204, a display device 205, an operation device 206, an interface (I/F) device 207, and a drive device 208. The respective hardware components of the image processing apparatus 120 are coupled to each other via a bus 209.

The CPU 201 is a calculation device that runs various programs installed in the auxiliary storage device 204 (for example, an image processing program and so on).

The RUM 202 is a non-volatile memory. The ROM 202 functions as a main storage device which stores various programs, data, and so on to be used by the CPU 201 to run the various programs installed in the auxiliary storage device 204. Specifically, for example, the ROM 202 functions as a main storage device which stores a boot program and so on such as a basic input/output system (BIOS) and an extensible firmware interface (EFI).

The RAM 203 is a volatile memory such as a dynamic random-access memory (DRAM) or a static random-access memory (SRAM). The RAM 203 functions as a main storage device which provides a work area on which the various programs installed in the auxiliary storage device 204 are developed for execution by the CPU 201.

The auxiliary storage device 204 is an auxiliary storage device which stores various programs. The display device 205 is a display device which displays an internal state of the image processing apparatus 120 or the like. The operation device 206 is an input device to be used by an administrator of the image processing apparatus 120 to input various instructions to the image processing apparatus 120.

The I/F device 207 is a communication device which couples the imaging device 111 and the data storage unit 130 to the image processing apparatus 120, and performs communications between the imaging device 111 and the data storage unit 130, and the image processing apparatus 120.

The drive device 208 is a device in which a recording medium 210 is set. The recording medium 210 discussed herein includes media which record information optically, electrically, and magnetically like a CD-ROM, a flexible disk, a magnetooptical disk, and so forth. The recording medium 210 may also include a semiconductor memory and so on, such as a ROM and a flash memory, which record information electrically.

The various programs installed in the auxiliary storage device 204 are installed, for example, in such a way that the distributed recording medium 210 is set in the drive device 208, and the various programs recorded in the recording medium 210 are read by the drive device 208. Alternatively, the various programs installed in the auxiliary storage device 204 may be installed by being downloaded from a network that is not illustrated.

Figure 3:
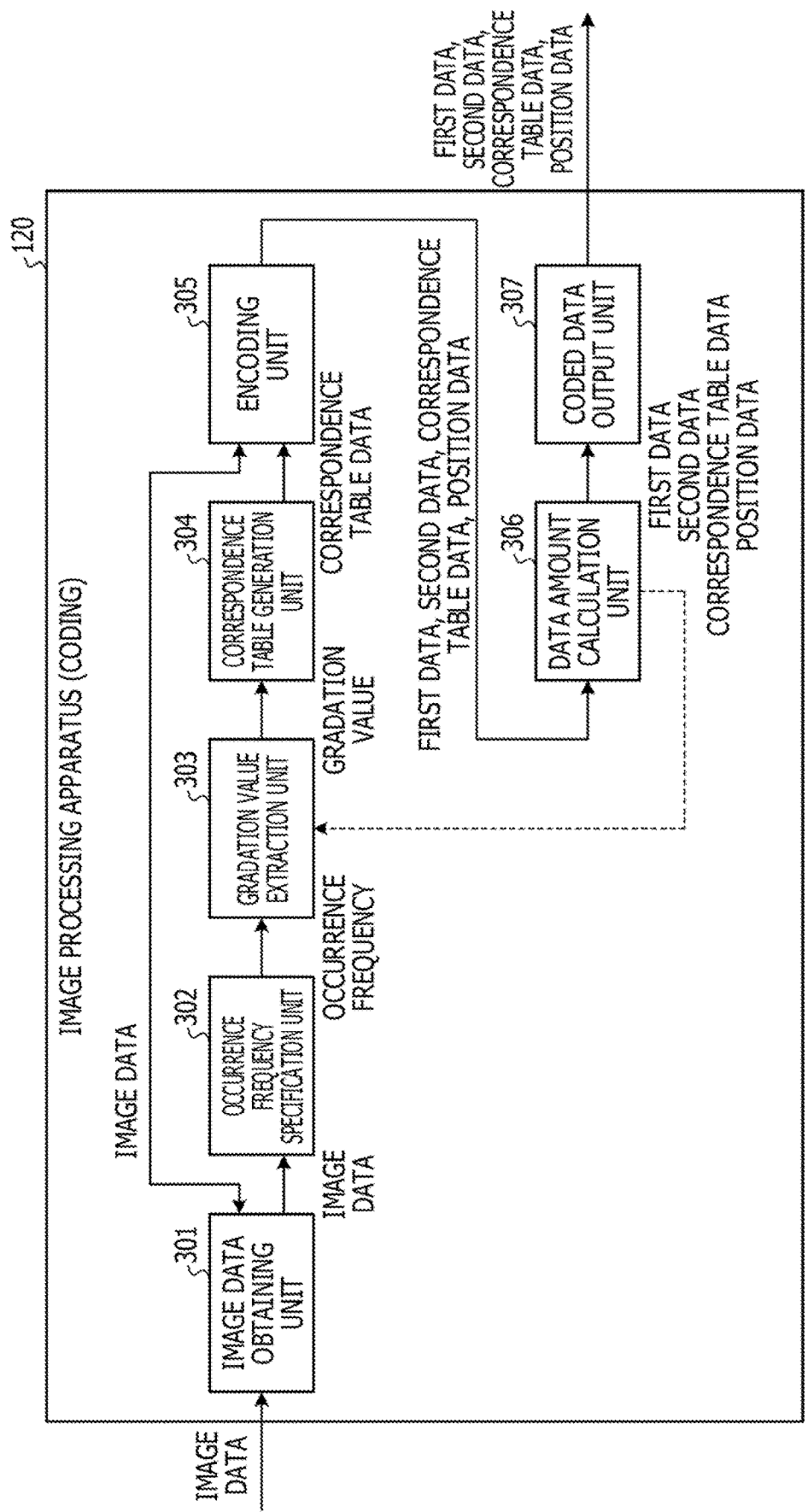
FIG. 3 is a diagram illustrating one example of a functional configuration of a function related to encoding of the image processing apparatus.

Next, a functional configuration of a function related to encoding realized when the image processing program is executed in the image processing apparatus 120 is described. FIG. 3 is a diagram illustrating one example of the functional configuration of the function related to the encoding of the image processing apparatus. As illustrated in FIG. 3, the image processing apparatus 120 includes an image data obtaining unit 301, an occurrence frequency specification unit 302, a gradation value extraction unit 303, a correspondence table generation unit 304, an encoding unit 305, a data amount calculation unit 306, and a coded data output unit 307 as functions related to the encoding.

The image data obtaining unit 301 obtains Image data from the imaging device 111. The image data obtaining unit 301 notifies the occurrence frequency specification unit 302 and the encoding unit 305 of the obtained image data.

The occurrence frequency specification unit 302 is one example of a specification unit. The occurrence frequency specification unit 302 generates a histogram based on the image data. Consequently, the occurrence frequency specification unit 302 specifies occurrence frequencies of the respective gradation values with regard to a plurality of pixels included in the image data that has been notified of and represented by gradation values of a predetermined bit count. The occurrence frequency specification unit 302 notifies the gradation value extraction unit 303 of the specified occurrence frequencies of the respective gradation values.

The gradation value extraction unit 303 specifies a gradation value at which the occurrence frequency becomes the highest from among the plurality of gradation values. The gradation value extraction unit 303 extracts a predetermined number of gradation values including the gradation value at which the occurrence frequency becomes the highest and gradation values before and after the gradation value. The gradation value extraction unit 303 notifies the correspondence table generation unit 304 of the predetermined number of extracted gradation values.

The correspondence table generation unit 304 generates correspondence table data (correspondence information) for performing bit conversion of the predetermined number of extracted gradation values into coded values of a bit count in accordance with the predetermined number. The correspondence table generation unit 304 notifies the encoding unit 305 of the correspondence table data.

The encoding unit 305 performs the bit conversion of the pixel having any one of the predetermined number of extracted gradation values among the plurality of pixels included in the image data into the coded value of the bit count in accordance with the predetermined number based on the correspondence table data. The encoding unit 305 performs the bit conversion of the pixel having any one of gradation values other than the predetermined number of extracted gradation values among the plurality of pixels included in the image data into the coded value of the predetermined bit count based on the value of the gradation value. After the conversion, the encoding unit 305 divides the bit-converted coded value into respective coded values of the bit count in accordance with the predetermined number and the remaining bit count.

The encoding unit 305 generates the first data including data related to the pixels in which the predetermined number of extracted respective gradation values are bit-converted into the coded values, and data related to the pixels in which gradation values other than the predetermined number of extracted gradation values are separated into the bit count in accordance with the predetermined number.

The encoding unit 305 generates the second data including data related to the pixels in which the gradation values other than the predetermined number of extracted gradation values are separated into the remaining bit count.

The encoding unit 305 generates position data indicating positions of the pixels having the gradation values other than the predetermined number of extracted gradation values.

The encoding unit 305 notifies the data amount calculation unit 306 of the generated coded data (the first data, the second data, the position data, and the correspondence table data).

The data amount calculation unit 306 calculates the data amount of the coded data obtained by encoding the image data. The data amount calculation unit 306 calculates the data amounts of the respective coded data notified of by the encoding unit 305 in respective cases where the predetermined numbers set in the gradation value extraction unit 303 are set as different numbers. The data amount calculation unit 306 notifies the coded data output unit 307 of the coded data in which the data amount becomes the lowest among the coded data notified of by the encoding unit 305.

The coded data output unit 307 stores the coded data (the first data, the second data, the correspondence table data, and the position data) notified of by the data amount calculation unit 306 in the data storage unit 130.

Next, specific examples of processing of the respective units of the image processing apparatus 120 (herein, the occurrence frequency specification unit 302, the gradation value extraction unit 303, the correspondence table generation unit 304, the encoding unit 305, and the data amount calculation unit 306) is described.

Figure 4:
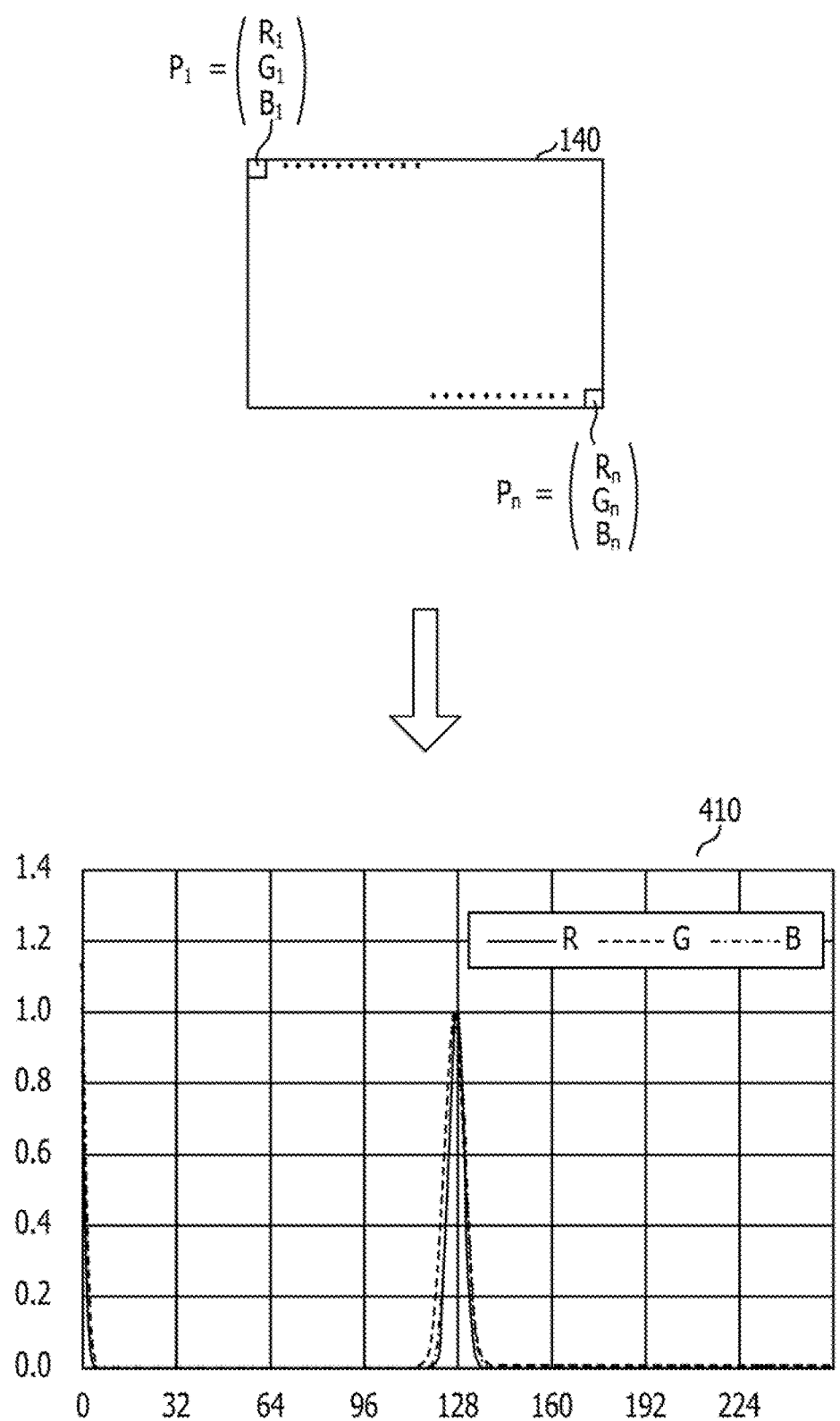
FIG. 4 is a diagram illustrating a specific example of processing of an occurrence frequency specification unit.

A specific example of processing of the occurrence frequency specification unit 302 is described. FIG. 4 is a diagram illustrating a specific example of the processing of the occurrence frequency specification unit. As illustrated in FIG. 4, the image data 140 of which the occurrence frequency specification unit 302 is notified includes n pixels, and the respective pixels ($P_1$ to $P_n$) respectively include respective gradation values of ($R_1$, $G_1$, $B_1$) to ($R_n$, $G_n$, $B_n$) of a predetermined bit count (8-bit).

As illustrated in FIG. 4, the occurrence frequency specification unit 302 generates a histogram 410 and specifies the occurrence frequencies of the respective gradation values with regard to the n pixels included in the image data 140. According to the first embodiment, the occurrence frequency specification unit 302 generates histograms separately in respective color components of an R value, a G value, and a B value.

Figure 5:
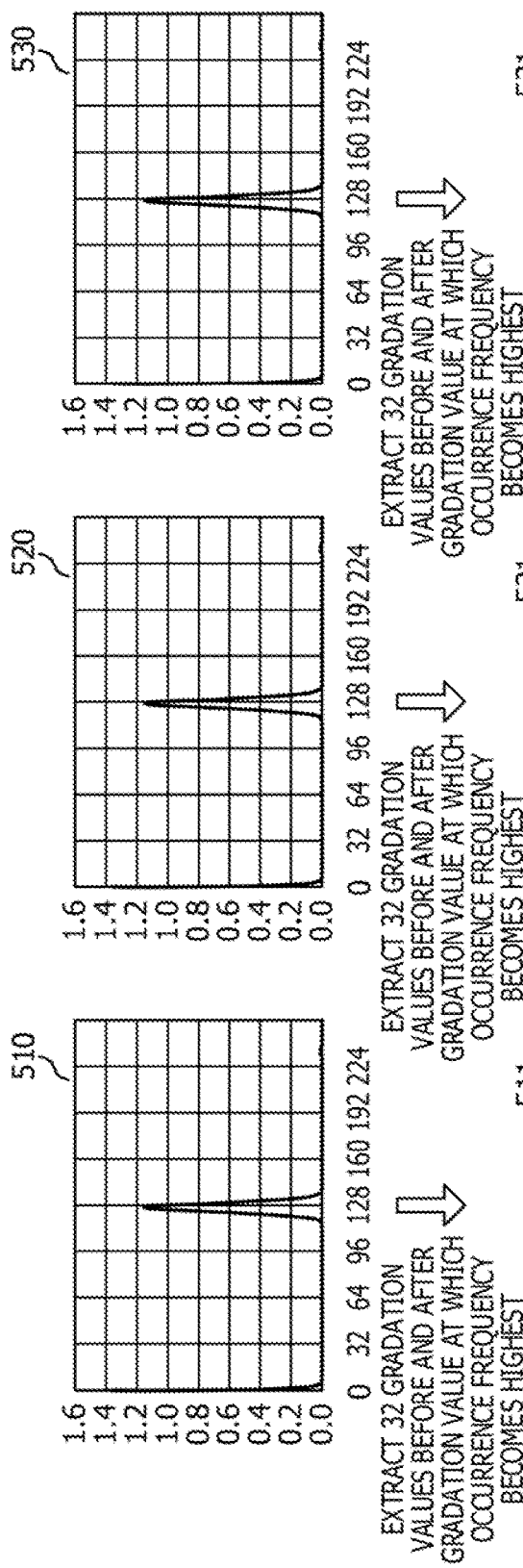
FIG. 5 is a first diagram illustrating a specific example of processing of a gradation value extraction unit and a correspondence table generation unit.

Next, a specific example of the processing of the gradation value extraction unit 303 and the correspondence table generation unit 304 is described. FIG. 5 is a first diagram illustrating a specific example of the processing of the gradation value extraction unit and the correspondence table generation unit. In FIG. 5, histograms 510, 520, and 530 are respectively a histogram of the R value, a histogram of the G value, and a histogram of the B value generated by the occurrence frequency specification unit 302.

As illustrated in FIG. 5, the gradation value extraction unit 303 specifies the gradation value at which the occurrence frequency becomes the highest from the histogram 510. The gradation value extraction unit 303 extracts the predetermined number (herein, 32) of gradation values including the gradation value ($R_{f1}$) at which the occurrence frequency becomes the highest and the gradation values ($R_{f2}$ to $R_{f32}$) before and after the gradation value ($R_{f1}$).

The correspondence table generation unit 304 performs the bit conversion of the 32 extracted gradation values ($R_{f1}$ to $R_{f32}$) into the coded values (0 to 31) of the bit count (5-bit) in accordance with the number (32) of extracted gradation values based on the correspondence table data 511.

Similarly, the gradation value extraction unit 303 specifies the gradation value at which the occurrence frequency becomes the highest from the histogram 520, and extracts the 32 gradation values including the gradation value ($G_{f1}$) at which the occurrence frequency becomes the highest and the gradation values ($G_{f2}$ to $G_{f32}$) before and after the gradation value ($G_{f1}$).

The correspondence table generation unit 304 performs the bit conversion of the 32 extracted gradation values ($G_{f1}$ to $G_{f32}$) into the coded values (0 to 31) of the bit count (5-bit) in accordance with the number (32) of extracted gradation values based on the correspondence table data 521.

Similarly, the gradation value extraction unit 303 specifies the gradation value at which the occurrence frequency becomes the highest from the histogram 530, and extracts the 32 gradation values including the gradation value ($B_{f1}$) at which the occurrence frequency becomes the highest and the gradation values ($B_{f2}$ to $B_{r32}$) before and after the gradation value ($B_{f1}$).

The correspondence table generation unit 304 performs the bit conversion of the 32 extracted gradation values ($B_{f1}$ to $B_{f32}$) into the coded values (0 to 31) of the bit count (5-bit) in accordance with the number (32) of extracted gradation values based on the correspondence table data 531.

Figure 6:
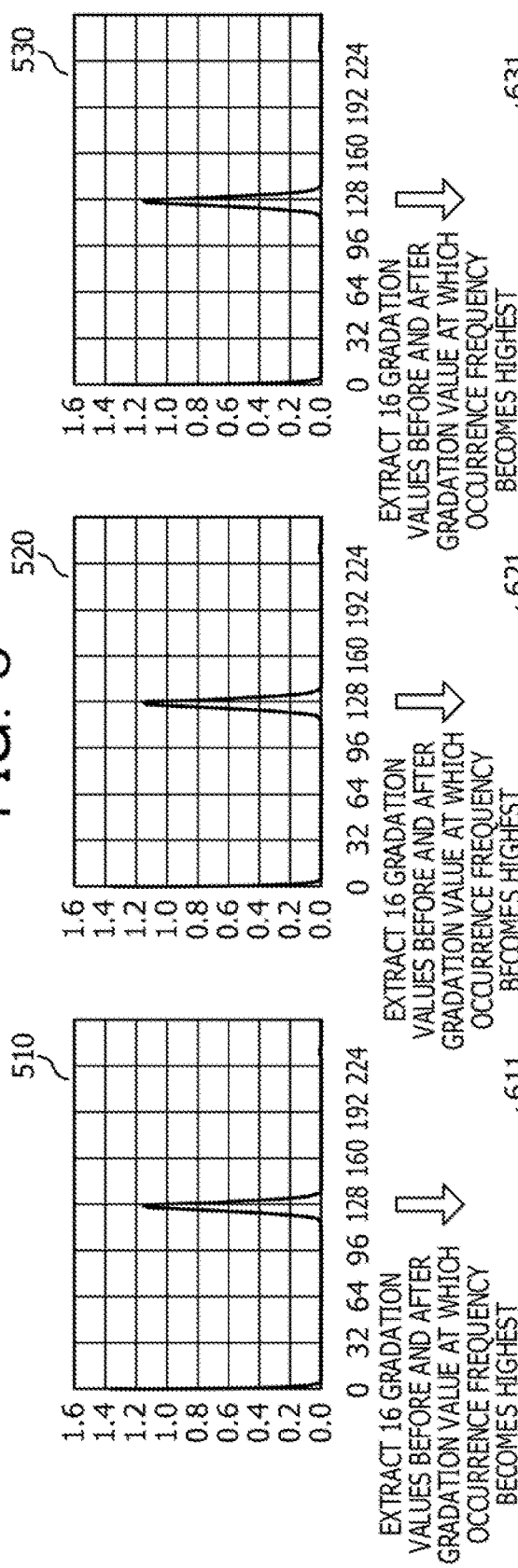
FIG. 6 is a second diagram illustrating a specific example of the processing of the gradation value extraction unit and the correspondence table generation unit.

FIG. 6 is a second diagram illustrating a specific example of the processing of the gradation value extraction unit and the correspondence table generation unit. A difference from FIG. 5 resides in the numbers of gradation values respectively extracted from the histograms 510, 520, and 530 by the gradation value extraction unit 303. In the case of FIG. 6, the gradation value extraction unit 303 extracts 16 gradation values as the predetermined number of gradation values.

When the number of gradation values extracted by the gradation value extraction unit 303 is 16, the correspondence table generation unit 304 performs the bit conversion of the 16 extracted gradation values into the coded values (0 to 15) of the bit count (4-bit) in accordance with the number (16) of extracted gradation values.

Specifically, for example, the correspondence table generation unit 304 performs the bit conversion of the 16 extracted gradation values ($R_{f1}$ to $R_{f16}$) into the coded values (0 to 15) of the bit count (4-bit) in accordance with the number (16) of extracted gradation values based on the correspondence table data 611.

Similarly, the correspondence table generation unit 304 performs the bit conversion of the extracted 16 gradation values ($G_{f1}$ to $G_{f16}$) into the coded values (0 to 15) of the bit count (4-bit) in accordance with the number (16) of extracted gradation values based on the correspondence table data 621.

Similarly, the correspondence table generation unit 304 performs the bit conversion of the extracted 16 gradation values ($B_{f1}$ to $B_{f16}$) into the coded values (0 to 15) of the bit count (4-bit) in accordance with the number (16) of extracted gradation values based on the correspondence table data 631.

In this manner, the numbers of gradation values respectively extracted from the histograms 510, 520, and 530 are sequentially changed in the gradation value extraction unit 303. FIGS. 4 and 5 illustrate cases where the numbers of gradation values respectively extracted from the gradation value extraction unit 303 are "32" and "16", but a predetermined number other than "32" and "16" (a factorial of 2, for example, 2, 4, 64, or 128) may also be adopted.

Figure 7A:
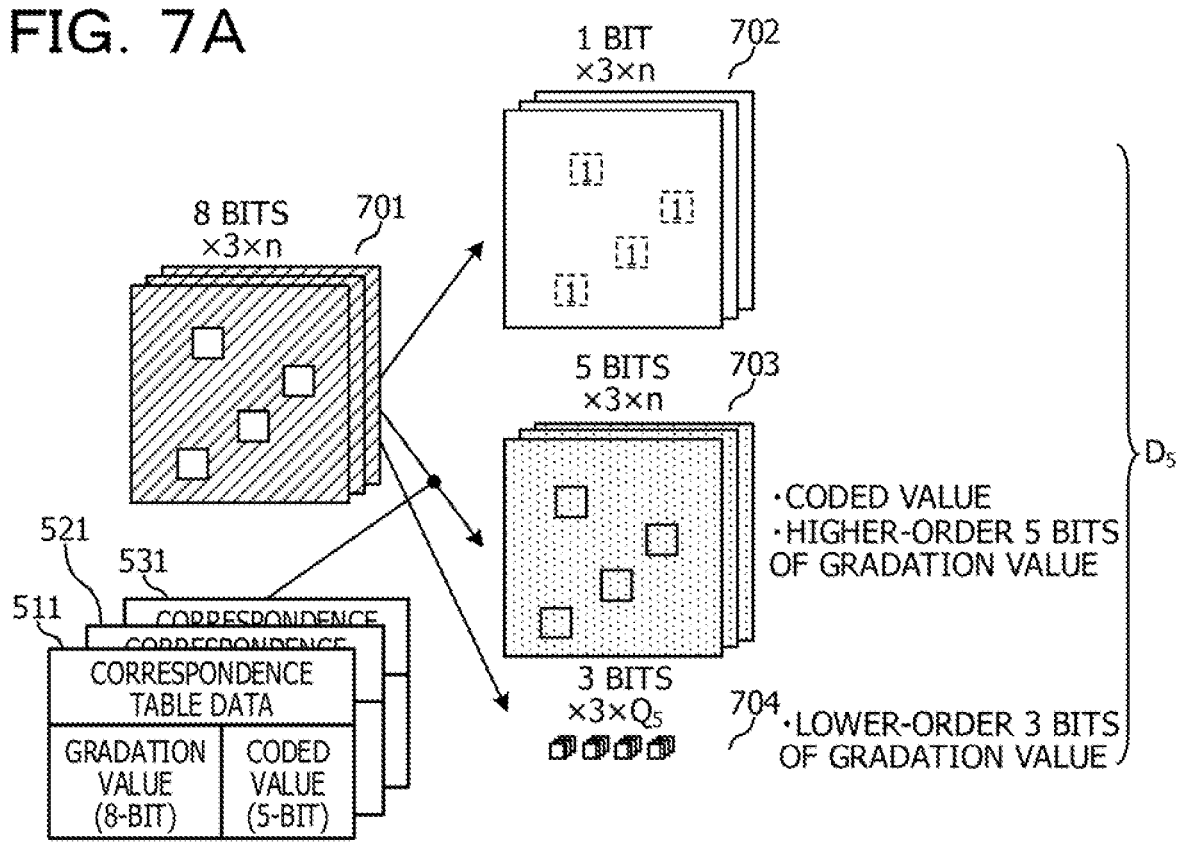
FIGS. 7A and 7B are diagrams illustrating a specific example of processing of an encoding unit.
Figure 7B:
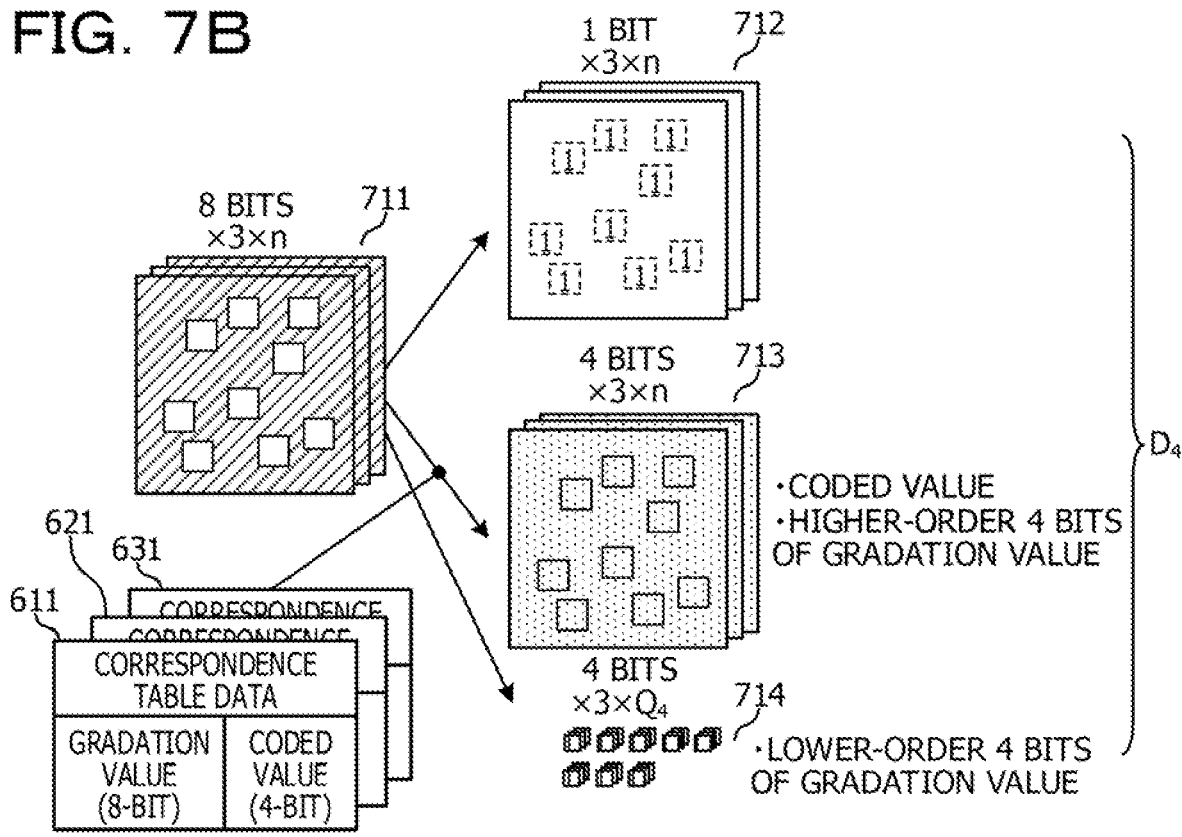

Next, a specific example of the processing of the encoding unit 305 is described. FIGS. 7A and 7B are diagrams illustrating a specific example of the processing of the encoding unit. In FIG. 7A, for convenience, the image data 701 is illustrated in which the image data 140 is separated into the pixels having any one of the 32 gradation values extracted by the gradation value extraction unit 303 and the pixels having any one of the other gradation values.

In the image data 701, a hatched area indicates an area including the pixels having any one of the gradation values extracted by the gradation value extraction unit 303. In the image data 701, a white area indicates an area including the pixels having any one of gradation values other than the gradation values extracted by the gradation value extraction unit 303. Since the image data 701 includes Image data of the respective color components of the R value, the G value, and the B value, and the respective image data include n 8-bit pixels, the data amount of the image data 701 becomes 8 bits×3×n.

The encoding unit 305 generates coded data including the position data 702, the first data 703, the second data 704, and the correspondence table data 511 to 531 based on the image data 701.

The position data 702 is data indicating a position of the pixel having any one of gradation values other than the predetermined number (32, herein) of extracted gradation values. In the example in FIG. 7A, "0" is assigned to a position of the pixel having any one of the 32 gradation values extracted by the gradation value extraction unit 303, and "1" is assigned to a position of the pixel having any one of the other gradation values to generate the position data 702. To simplify the drawing, "0" is omitted.

Since the position data 702 includes position data of the respective color components of the R value, the G value, and the B value, and the respective position data include n 1-bit pixels, the data amount of the position data 702 becomes 1 bit×3×n.

The first data 703 is generated by assigning the bit-converted coded value to the pixel having any one of the 32 gradation values extracted by the gradation value extraction unit 303 among the pixels included in the image data 701 based on the correspondence table data 511 to 531. The first data 703 is generated by assigning higher-order 5 bits of the gradation value to the pixel having any one of gradation values other than the gradation values extracted by the gradation value extraction unit 303 among the pixels included in the image data 701. The higher-order 5 bits of the gradation value is "11000" when gradation value is "193" ("11000001"), for example.

Since the first data 703 includes first data of the respective color components of the R value, the G value, and the B value, and the respective first data include n 5-bit pixels, the data amount of the first data 703 becomes 5 bits×3×n.

The second data 704 is generated by assigning lower-order 3 bits of the gradation value to the pixel having any one of gradation values other than the gradation values extracted by the gradation value extraction unit 303 among the pixels included in the image data 701. The lower-order 3 bits of the gradation value is "001" when gradation value is "193" ("11000001"), for example.

Since the second data 704 includes second data of the respective color components of the R value, the G value, and the B value, and the respective second data include $Q_5$ 3-bit pixels, the data amount of the second data 704 becomes 3 bits×3×$Q_5$.

In the aforementioned specific example, the example has been described in which the pixel having any one of gradation values other than the gradation values extracted is separated into the higher-order 5 bits and the lower-order 3 bits, but the pixel is not necessarily separated into the higher-order 5 bits and the lower-order 3 bits, and for example, a change may be appropriately made such as the higher-order 3 bits and the lower-order 5 bits.

In the example of FIG. 7A, the situation is illustrated where the bit conversion of the respective 32 gradation values is performed into the 5-bit coded values to generate the coded data having the data amount "$D_5$".

In FIG. 7B, image data 711 is illustrated in which, for convenience, the image data 140 is separated into the pixels having any one of the 16 gradation values extracted by the gradation value extraction unit 303 and the pixels having any one of the other gradation values.

In the image data 711, a hatched area indicates an area including the pixel having any one of the gradation values extracted by the gradation value extraction unit 303. In the image data 711, a white area indicates an area including the pixel having any one of gradation values other than the gradation values extracted by the gradation value extraction unit 303. As is apparent from the comparison with the image data 701, since the gradation values extracted by the gradation value extraction unit 303 is decreased, the area of the hatched area is decreased, and the area of the white area is increased.

Since the image data 711 includes image data of the respective color components of the R value, the G value, and the B value, and the respective image data include n 8-bit pixels, the data amount of the image data 711 becomes 8 bits×3×n.

The encoding unit 305 generates coded data including position data 712, first data 713, second data 714, and correspondence table data 611 to 631 based on the image data 711.

The position data 712 is data indicating a position of the pixel having any one of gradation values other than the predetermined number (16, herein) of extracted gradation values.

The first data 713 is generated by assigning the bit-converted coded value to the pixel having any one of the 16 gradation values extracted by the gradation value extraction unit 303 among the pixels included in the image data 711 based on the correspondence table data 611 to 631. The first data 713 is generated by assigning higher-order 4 bits of the gradation value to the pixel having any one of gradation values other than the gradation values extracted by the gradation value extraction unit 303 among the pixels included in the image data 711. The higher-order 4 bits of the gradation value is "1100" when gradation value is "193" ("11000001"), for example.

Since the first data 713 includes first data of the respective color components of the R value, the G value, and the B value, and the respective first data include n 4-bit pixels, the data amount of the first data 713 becomes 4 bits×3×n.

The second data 714 is generated by assigning lower-order 4 bits of the gradation value to the pixel having any one of gradation values other than the gradation values extracted by the gradation value extraction unit 303 among the pixels included in the image data 711. The lower-order 4 bits of the gradation value is "0001" when gradation value is "193" ("11000001"), for example.

Since the second data 714 includes second data of the respective color components of the R value, the G value, and the B value, and the respective second data include $Q_4$ 4-bit pixels, the dab amount of the second data 714 becomes 4 bits×3×Q.

In the example of FIG. 7B, the situation is illustrated where the bit conversion of the respective 16 gradation values is performed into the 4-bit coded values to generate the coded data having the data amount "$D_4$".

Figure 8:
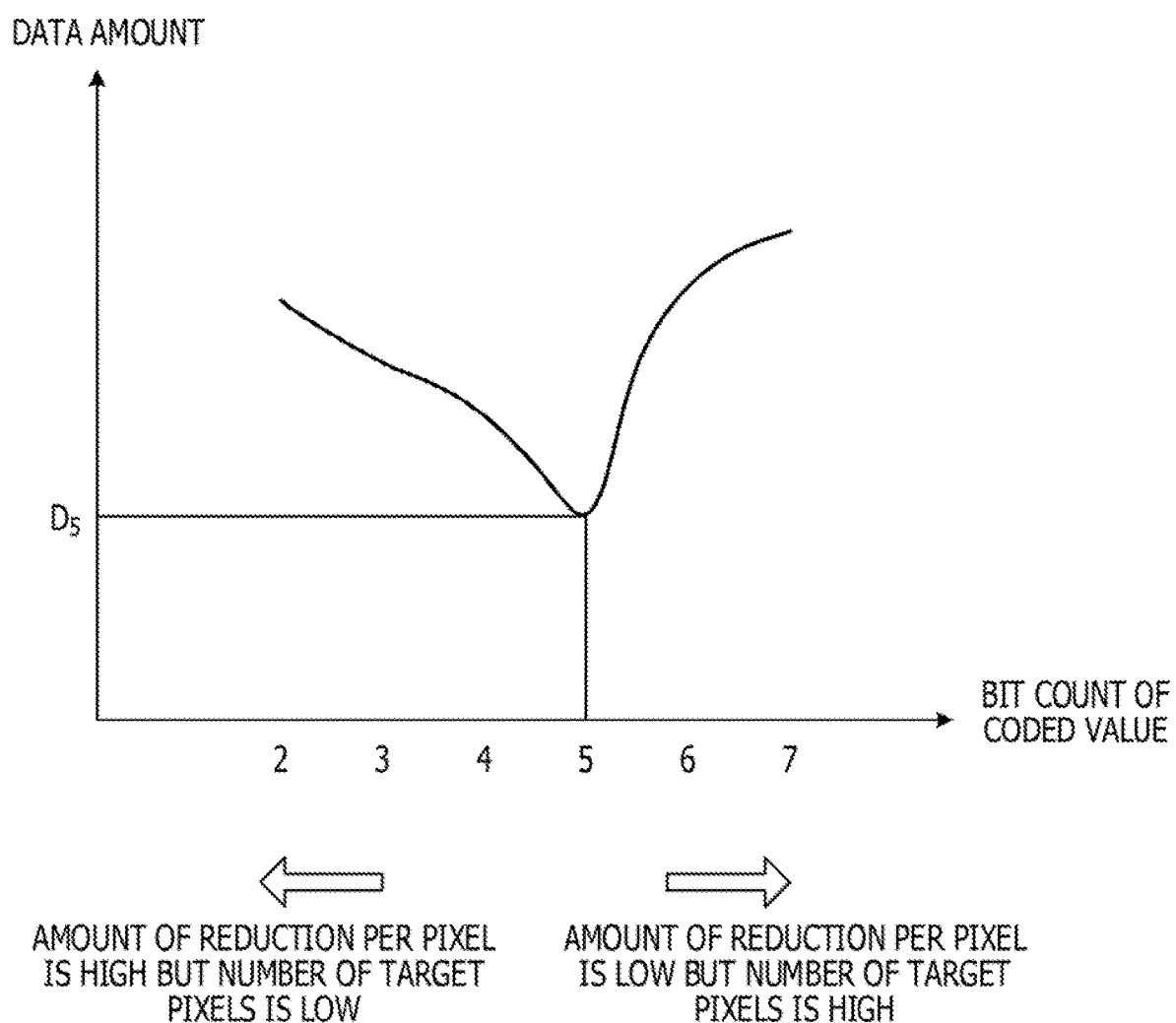
FIG. 8 is a diagram illustrating a specific example of processing of a data amount calculation unit.

Next, a specific example of the processing of the data amount calculation unit 306 is described. FIG. 8 is a diagram illustrating a specific example of the processing of the data amount calculation unit. In a graphic expression in FIG. 8, a horizontal axis represents a bit count of a coded value, and a vertical axis represents a data amount of coded data. As illustrated in FIG. 8, the bit count of the coded value (corresponding to the number of extracted gradation values) is sequentially changed to change the data amount of the coded data. The data amount calculation unit 306 determines the bit count of the coded value when the data amount of the coded data becomes the lowest.

When the bit count of the coded value is decreased, since the reduction amount per pixel is high, but the number of gradation values extracted by the gradation value extraction unit 303 is decreased, the number of pixels set as the target of the bit conversion is decreased. When the bit count of the coded value is increased, since the reduction amount per pixel is low, but the number of gradation values extracted by the gradation value extraction unit 303 is increased, the number of pixels set as the target of the bit conversion is also increased.

For this reason, as illustrated in FIG. 8, the lowest value of the data amount of the coded data may be obtained by increasing and decreasing the bit count of the coded value. The example of FIG. 8 illustrates that, when the bit count of the coded value is "5-bit", the data amount of the coded data becomes the lowest "$D_5$".

Figure 9:
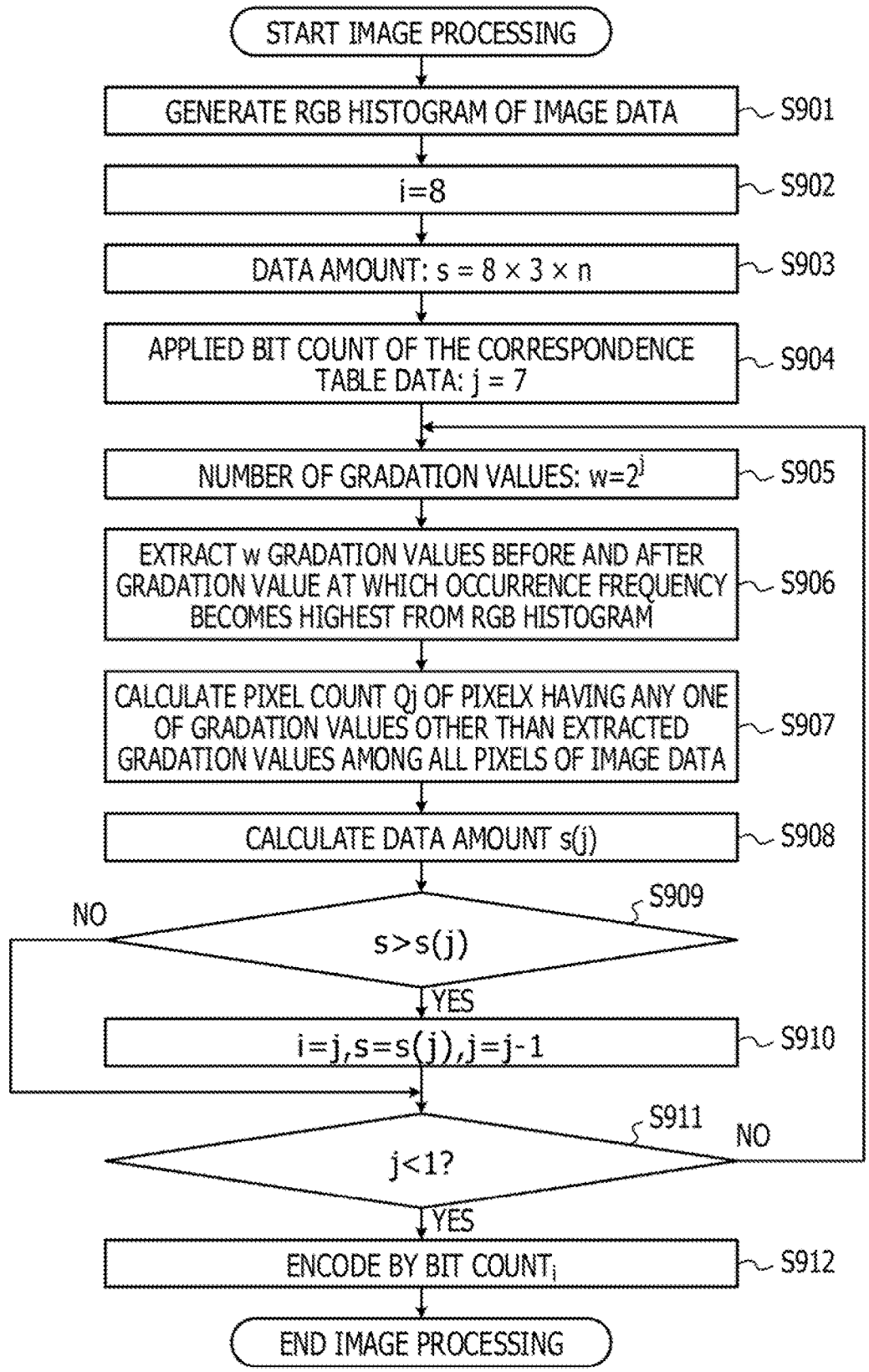
FIG. 9 is a flowchart illustrating a flow of mage processing by the image processing apparatus according to a first embodiment.

Next, a flow of image processing at the time of encoding by the image processing apparatus 120 is described. FIG. 9 is a flowchart illustrating the flow of the image processing by the image processing apparatus according to the first embodiment. When the image dab is transmitted from the imaging device 111, the image processing illustrated in FIG. 9 is started. FIG. 9 illustrates the image processing illustrated with regard to the image data for one frame among the image data transmitted from the imaging device 111.

In step S901, the image data obtaining unit 301 obtains the image data, and the occurrence frequency specification unit 302 generates respective histograms of the R value, the G value, and the B value with regard to the obtained image data.

In step S902, the gradation value extraction unit 303 assigns "8" to a bit count i of the coded value as an initial value.

In step S903, the data to amount calculation unit 306 assigns the data amount (=8×3×n) of the obtained image data to a lowest value s of the data amount of the coded data as an initial value.

In step S904, the gradation value extraction unit 303 assigns "7" to a bit count j to be sequentially changed of the coded value as an initial value.

In step S905, the gradation value extraction unit 303 calculates the number w ($=2^j$) of extracted gradation values.

In step S906, the gradation value extraction unit 303 specifies the gradation values at which the occurrence frequency becomes the highest from each of the histograms of the R value, the G value, and the B value, and extracts w gradation values before and after the gradation value including the gradation value.

In step S907, the data amount calculation unit 306 calculates the number $Q_j$ of the pixels including any one of gradation values other than the extracted gradation values among the pixels included in the image data.

In step S908, the data amount calculation unit 306 calculates the data amount s(j) of the coded data when w gradation values are extracted.

In step S908, the data amount calculation unit 306 determines whether or not the data amount s(j) is lower than the data amount s. In step S908, when it is determined that the data amount s(j) is lower than the data amount s, the flow proceeds to step S910.

In step S910, the data amount calculation unit 306 assigns the bit count j in the bit count i, and assigns the data amount s(j) into the data amount s. The data amount calculation unit 306 decrements the bit count j.

In step S911, the data amount calculation unit 306 determines whether or not the bit count j is lower than 1. When it is determined in step S911 that the bit count j is higher than or equal to 1 (No in step S911), the flow returns to step S905.

When it is determined in step S911 that the bit count j is lower than 1 (Yes in step S911), the flow proceeds to step S912.

In step S912, the gradation value extraction unit 303 extracts w gradation values, and the correspondence table generation unit 304 generates the correspondence table data for performing the bit conversion of the extracted gradation value into the coded value based on the bit count i. The encoding unit 305 generates the coded data, and the coded data output unit 307 outputs the generated the coded data.

As is apparent from the above explanation, in the image processing apparatus 120 according to the first embodiment, the predetermined number of the gradation values before and after the gradation value at which the occurrence frequency becomes the highest are extracted, and the correspondence table data for performing the bit conversion of the extracted gradation value into the coded value of the bit count in accordance with the predetermined number is generated. In the image processing apparatus 120 according to the first embodiment, the bit conversion of the pixel having any one of the predetermined number of gradation values among the plurality of pixels included in the image data is performed based on the correspondence table data. In the image processing apparatus 120 according to the first embodiment, the bit conversion of the pixel having any one of gradation values other than the predetermined number of gradation values into the coded value of the predetermined bit count is performed based on the value of the gradation value. After the conversion, the encoding unit 305 divides the bit-converted coded value into respective coded values of the bit count in accordance with the predetermined number and the remaining bit count.

When the respective pixels of the image data are processed in this manner, in accordance with the image processing apparatus 120 according to the first embodiment, the low-capacity lossless compression data may be generated from the image data.

According to the aforementioned first embodiment, it has been described that the occurrence frequency becomes the highest and the gradation values before and after the gradation value are extracted as the predetermined number of gradation values. In contrast, according to a second embodiment, the gradation values in which the occurrence frequency is high are rearranged in a descending order, and a predetermined number of higher-order gradation values having the high occurrence frequency are extracted. Hereinafter, the differences from the first embodiment is mainly described with regard to the second embodiment.

Figure 10:
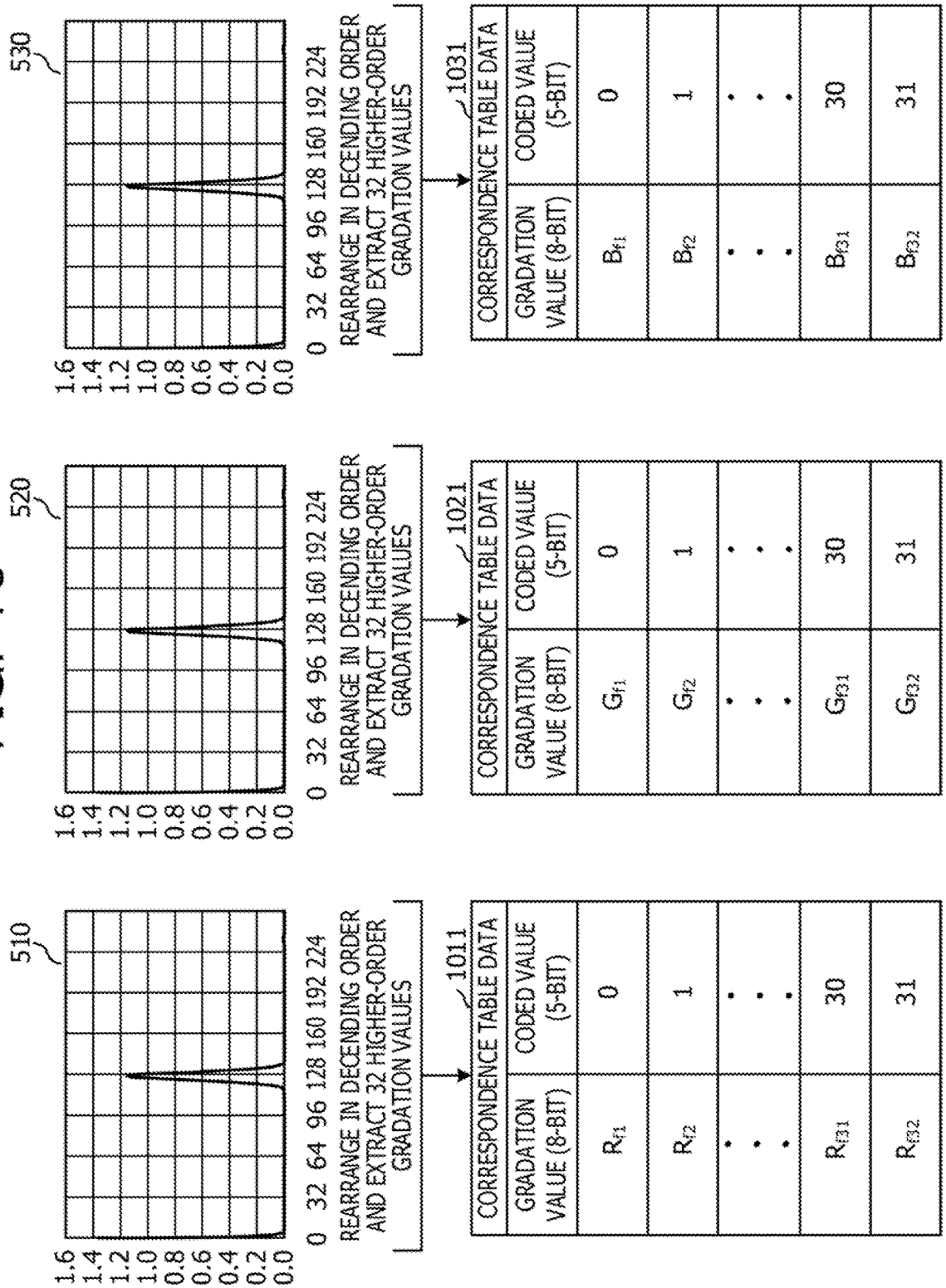
FIG. 10 is a third diagram illustrating a specific example of the processing of the gradation value extraction unit and the correspondence table generation unit.

FIG. 10 is a third diagram illustrating a specific example of the processing of the gradation value extraction unit and the correspondence table generation unit. As illustrated in FIG. 10, the gradation value extraction unit 303 according to the second embodiment extracts 32 higher-order gradation values ($R_{f1}$ to $R_{f32}$) having the high occurrence frequency from the histogram 510. The correspondence table generation unit 304 performs the bit conversion of the 32 extracted gradation values ($R_{f1}$ to $R_{f32}$) into the coded values (0 to 31) of the bit count (5-bit) in accordance with the number (32) of extracted gradation values based on the correspondence table data 1011.

Similarly, the gradation value extraction unit 303 extracts 32 higher-order gradation values ($G_{f1}$ to $G_{f32}$) having the high occurrence frequency from the histogram 520. The correspondence table generation unit 304 performs the bit conversion of the 32 extracted gradation values ($G_{f1}$ to $G_{f32}$) into the coded values (0 to 31) of the bit count (5-bit) in accordance with the number (32) of extracted gradation values based on the correspondence table data 1021.

Similarly, the gradation value extraction unit 303 extracts 32 higher-order gradation values ($B_{f1}$ to $B_{f32}$) having the high occurrence frequency from the histogram 530. The correspondence table generation unit 304 performs the bit conversion of the 32 extracted gradation values ($B_{f1}$ to $B_{f32}$) into the coded values (0 to 31) of the bit count (5-bit) in accordance with the number (32) of extracted gradation values based on the correspondence table data 1031.

Figure 11:
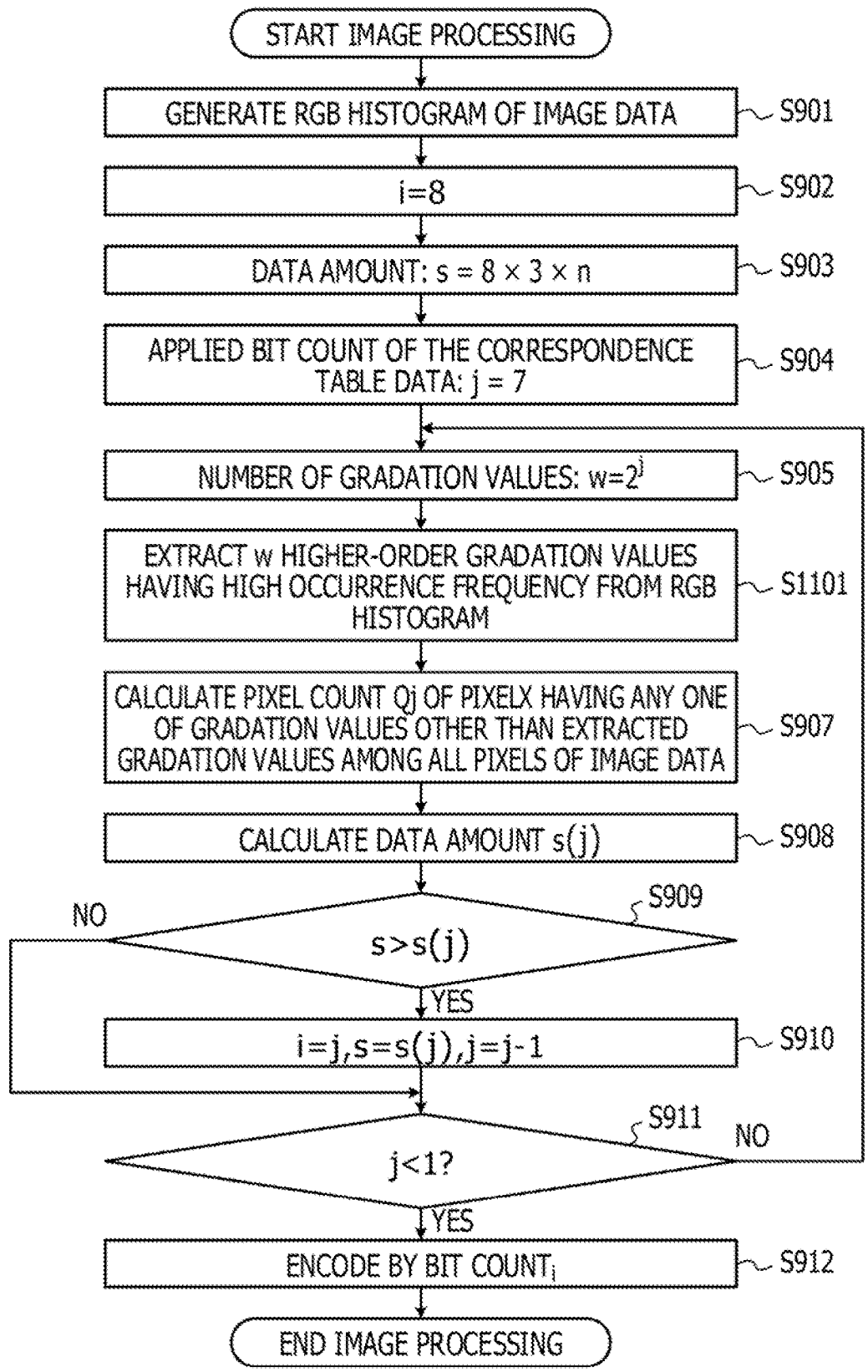
FIG. 11 is a flowchart illustrating a flow of the image processing by the image processing apparatus according to a second embodiment.

Next, a flow of the image processing at the time of encoding by the image processing apparatus 120 according to the second embodiment is described. FIG. 11 is a flowchart illustrating the flow of the image processing by the image processing apparatus according to the second embodiment. A difference from FIG. 9 resides in step S1101.

In step S1101, the gradation value extraction unit 303 extracts w higher-order gradation values having the high occurrence frequency from each of the histograms of the R value, the G value, and the B value.

As is apparent from the aforementioned explanation, when the gradation values are extracted based on the occurrence frequencies of the gradation values, the image processing apparatus 120 according to the second embodiment rearranges the gradation values having the high occurrence frequency in the descending order and extracts the predetermined number of higher-order gradation values. Consequently, in accordance with the image processing apparatus 120 according to the second embodiment, when the number of gradation values bit-converted into the coded values is the same, the number of pixels set as the bit conversion target may be maximized.

According to the aforementioned first and second embodiments, it has been described that the gradation values subjected to the bit conversion are extracted based on the occurrence frequencies of the gradation values with regard to each of the histograms of the R value, the G value, and the B value. In contrast, according to a third embodiment, the respective histograms of the R value, the G value, and the B value are added to one another, and combinations of the gradation values subjected to the bit conversion are extracted based on the occurrence frequencies of gradation values from the histogram obtained by the addition. Hereinafter, the third embodiment is described mainly in terms of the differences from the aforementioned first or second embodiment.

Figure 12:
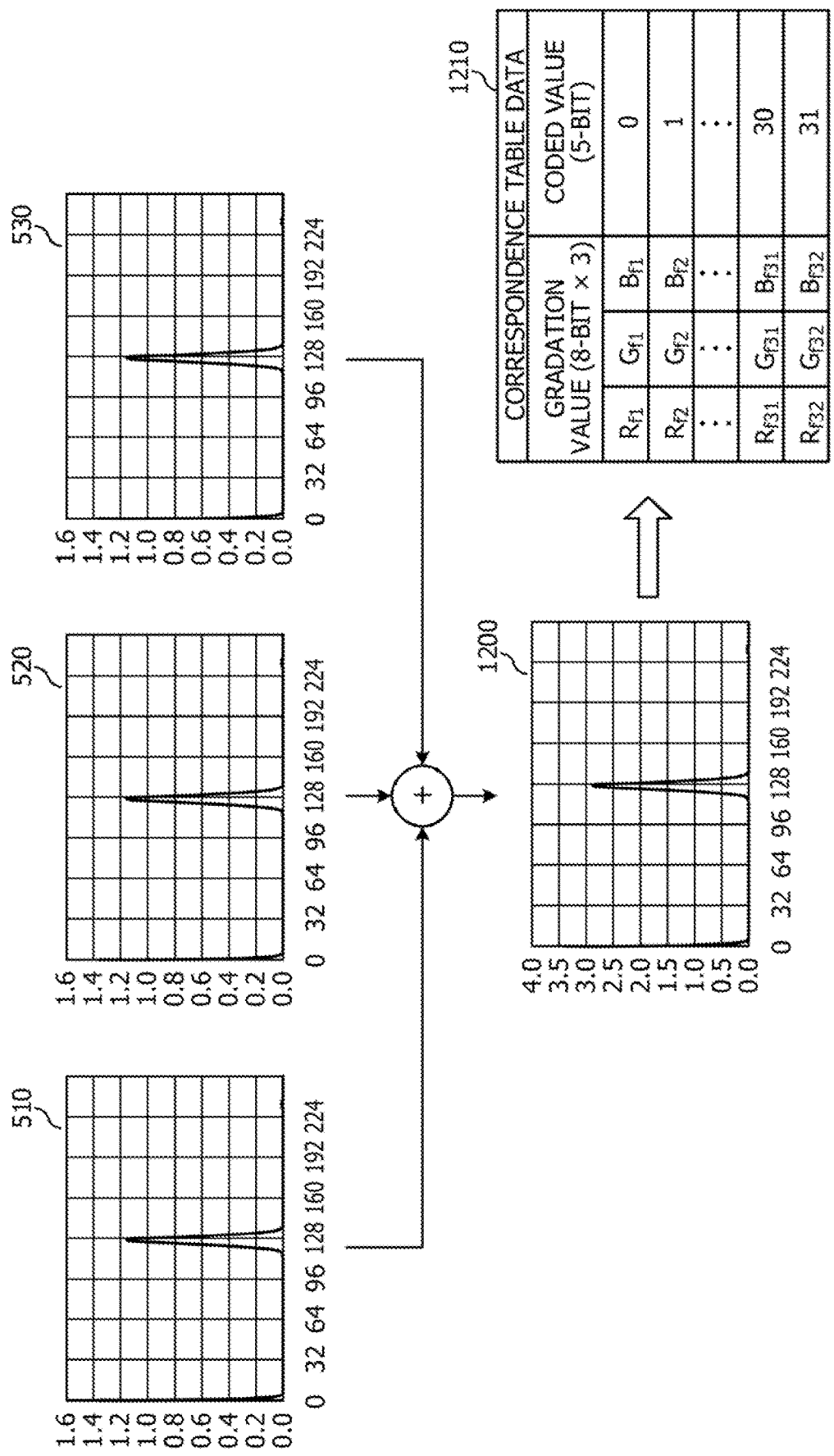
FIG. 12 is a fourth diagram illustrating a specific example of the processing of the gradation value extraction unit and the correspondence table generation unit.

FIG. 12 is a fourth diagram illustrating a specific example of the processing of the gradation value extraction unit and the correspondence table generation unit. As illustrated in FIG. 12, according to the third embodiment, the gradation value extraction unit 303 adds the histograms 510, 520, and 530 with one another to generate a histogram 1200. The histogram 1200 is generated by adding the occurrence frequencies of the respective gradation values of the histograms 510, 520, and 530 for each gradation value.

The gradation value extraction unit 303 according to the third embodiment extracts 32 higher-order combinations ($R_{f1}$, $G_{f1}$, $B_{f1}$) to ($R_{f32}$, $G_{f32}$, $B_{f32}$) of the gradation values having the high occurrence frequency from the histogram 1200. In each of the combinations of the gradation values, the same value is input to the R value, the G value, and the B value. For example, in the histogram 1200, when the occurrence frequency is the highest gradation value "128", ($R_{f1}$, $G_{f1}$, $B_{f1}$)=(128, 128, 128) is established.

As is apparent from the aforementioned explanation, the image processing apparatus 120 according to the third embodiment generates the histogram obtained by adding the histograms of the respective color components to one another when the gradation values are extracted based on the occurrence frequencies of the gradation values. Consequently, in accordance with the image processing apparatus 120 according to the third embodiment, the reduction amount per pixel when the bit conversion is performed into the coded value may be increased as compared with a case where the bit conversion is performed into the coded value for each color component.

According to the aforementioned first to third embodiments, the case has been described where the coded data is generated from the image data. According to a fourth embodiment, a case is described where the coded data is decoded to generate the image data.

Figure 13:
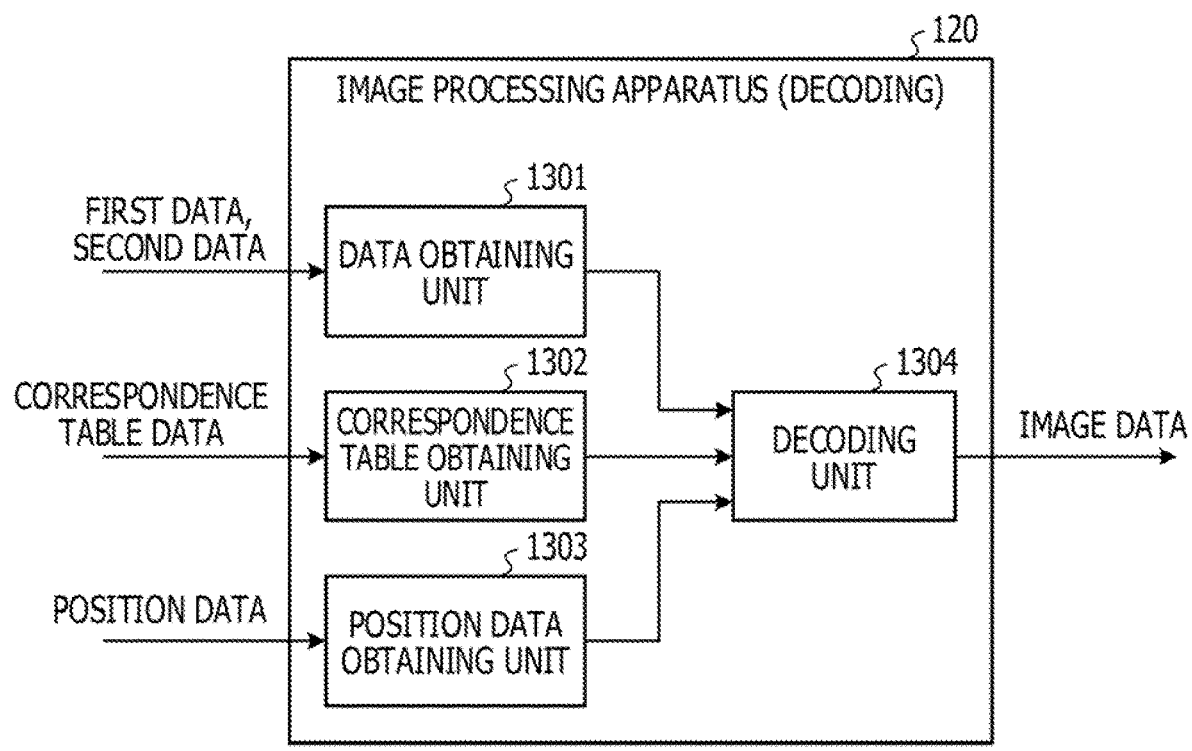
FIG. 13 is a diagram illustrating one example of a functional configuration of a function related to decoding of the image processing apparatus.

A functional configuration of a function related to decoding realized when the image processing program is executed in the image processing apparatus 120 is described. FIG. 13 is a diagram illustrating one example of the functional configuration of the function related to the decoding of the image processing apparatus. As illustrated in FIG. 13, the image processing apparatus 120 includes a data obtaining unit 1301, a correspondence table obtaining unit 1302, a position data obtaining unit 1303, and a decoding unit 1304 as the function related to the decoding.

The data obtaining unit 1301 obtains the first data and the second data from the data storage unit 130. The data obtaining unit 1301 notifies the decoding unit 1304 of the obtained first data and the obtained second data.

The correspondence table obtaining unit 1302 obtains the correspondence table data from the data storage unit 130. The correspondence table obtaining unit 1302 notifies the decoding unit 1304 of the obtained correspondence table data.

The position data obtaining unit 1303 obtains the position data from the data storage unit 130. The position data obtaining unit 1303 notifies the decoding unit 1304 of the obtained position data.

The decoding unit 1304 specifies pixels corresponding to any one of the predetermined number of gradation values based on the position data with regard to the first data, and converts coded values of the specified pixels into 8-bit gradation values based on the correspondence table data. The decoding unit 1304 specifies pixels corresponding to any one of gradation values other than the predetermined number of gradation values based on the position data with regard to the first data, and performs bit coupling of the corresponding gradation values of the second data to the gradation values of the specified pixels to generate the 8-bit gradation values. Consequently, the decoding unit 1304 may generate the image data.

Figure 14:
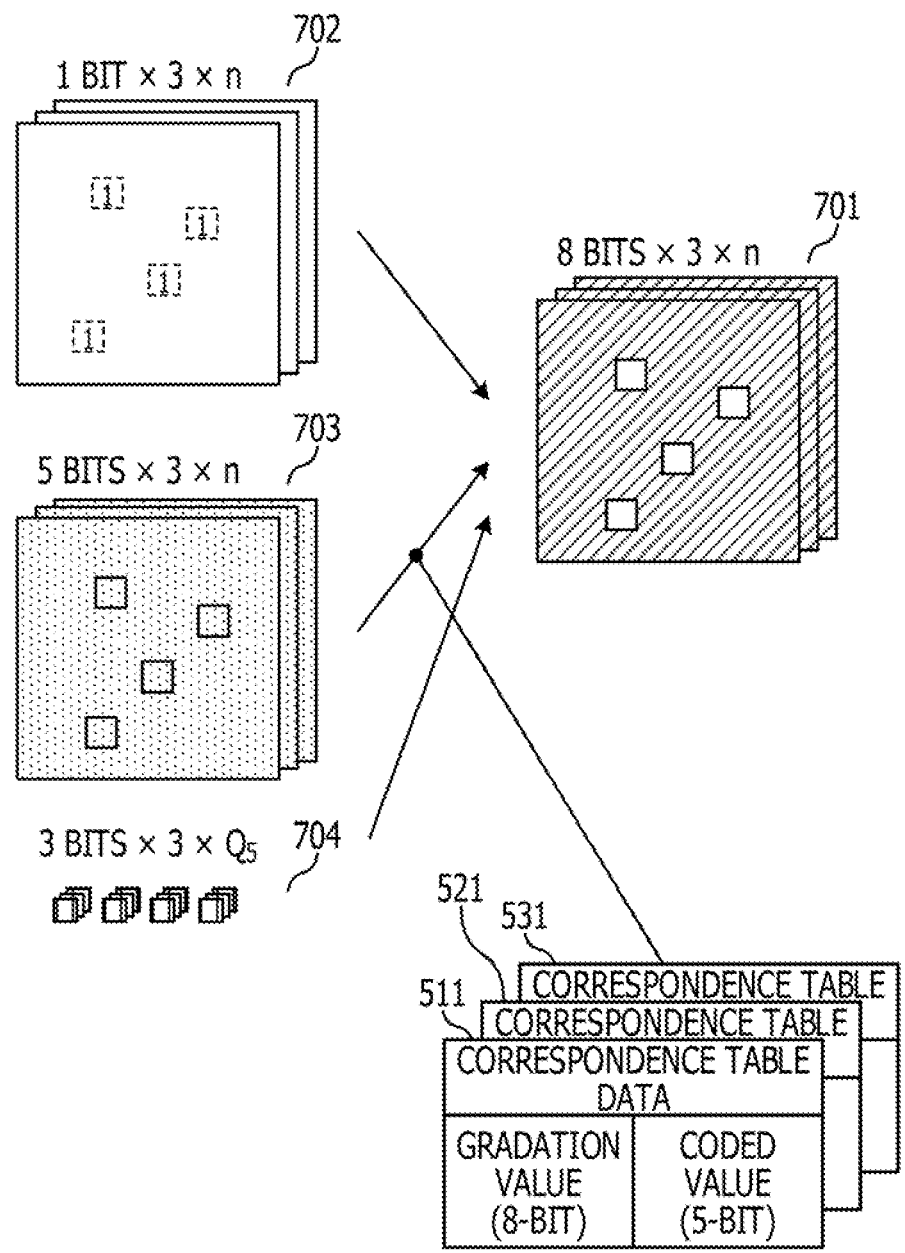
FIG. 14 is a diagram illustrating a specific example of processing of a decoding unit.

Next, a specific example of the processing of the decoding unit 1304 is described. FIG. 14 is a diagram illustrating a specific example of the processing of the decoding unit. In the image data in which the respective color components of the R value, the G value, and the B value are represented by the 8-bit gradation values, the specific example of a case is described where the coded data including the first data 703 is decoded in which the 32 gradation values are extracted, and the bit conversion into the 5-bit coded values is performed.

As illustrated in FIG. 14, in the position data 702, "1" is assigned to the pixels having any one of gradation values other than the extracted 32 gradation values. "0" is assigned to the pixels having any one of the extracted 32 gradation values but is left blank in the position data 702 for simplicity of the drawing.

As illustrated in FIG. 14, the pixels to which "0" is assigned among the respective pixels of the first data (5-bit data) 703 in the position data 702 include the coded values. The pixels to which "1" is assigned among the respective pixels of the first data (5-bit data) 703 in the position data 702 include higher-order 5 bits of the coded values.

As illustrated in FIG. 14, the respective pixels of the second data (3-bit data) 704 include lower-order 3 bits of the coded values.

The decoding unit 1304 specifies the pixels to which "0" is assigned in the position data 702, and converts the coded values of the first data (5-bit data) 703 with regard to the specified pixels into the 8-bit gradation values based on the correspondence table data 511.

The decoding unit 1304 specifies the pixels to which "1" is assigned in the position data 702 with regard to the first data (5-bit data) based on the position data 702. The decoding unit 1304 performs the bit coupling of the corresponding gradation values of the second data (3-bit data) to the gradation values of the specified pixels to generate the 8-bit gradation values.

Consequently, the decoding unit 1304 may generate the image data in which—the converted 8-bit gradation values are included in the pixels corresponding to the pixels to which "0" is assigned in the position data 702 and—the generated 8-bit gradation values are included in the pixels corresponding to the pixels to which "1" is assigned in the position data 702.

The decoding unit 1304 generates the image data 701 by performing the aforementioned processing with regard to each of the R value, the G value, and the B value.

As is apparent from the aforementioned explanation, the image processing apparatus 120 according to the fourth embodiment decodes the coded data (the first data, the second data, the position data, and the correspondence table data) stored in the data storage unit. Consequently, in accordance with the image processing apparatus 120 according to the fourth embodiment, the image data may be generated from the coded data.

According to the aforementioned first to third embodiments, it has been described that the gradation value at which the occurrence frequency becomes the highest is obtained for each image data for one frame, and the correspondence table data is generated. However, in the case of the structure such as the bridge beam, the gradation value at which the occurrence frequency becomes the highest in the captured image data is supposed to fall in a predetermined range. For this reason, a predetermined number of gradation values in which the gradation value at which the occurrence frequency becomes the highest falls may be previously set (for example, 32 gradation values and 16 gradation values in which the same gradation value becomes a center are sequentially set), and the correspondence table data for performing the bit conversion of the predetermined number of set gradation values into the coded values may also be generated.

Consequently, the situation may be avoided where the gradation value at which the occurrence frequency becomes the highest is obtained for each image data for one frame to generate the correspondence table data, and common gradation values may be extracted with respect to the image data for all the frames to generate common correspondence table data.

According to the aforementioned first to third embodiments, the case has been described where the image data in which the color components are the R value, the G value, and the B value is coded, but the color components are not limited to the R value, the G value, and the B value, and image data of other color components may be coded.

According to the aforementioned first to third embodiments, the case has been described where the image data having the gradation values of 8 bits as the predetermined bit count is coded, but the bit count of the gradation values of the respective pixels of the image data is not limited to 8 bits and may also be 16 bits, 32 bits, or the like.

The first data and the second data are not necessarily limited to the aforementioned formats. For example, the first data may include data related to the pixels that are bit-converted into the coded values of the bit count in accordance with the predetermined number based on the correspondence table data. The second data may include data related to the pixels that are bit-converted into the coded values of the predetermined bit count based on the values of the gradation values.

The present disclosure is not limited to the configurations illustrated herein while the configurations exemplified according to the aforementioned embodiments may also be combined with other elements, for example. These aspects may be changed without departing from the gist of the present disclosure and appropriately set in accordance with applied modes thereof.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium storing program that causes a computer to execute a process, the process comprising:
specifying occurrence frequencies of respective gradation values with regard to a plurality of pixels included in image data and represented by gradation values of a predetermined bit count;
extracting a predetermined number of gradation values from a gradation value having a high occurrence frequency in a descending order;
generating correspondence information for performing bit conversion of the extracted gradation values into coded values of a bit count in accordance with the predetermined number; and
encoding the image data by performing bit conversion of first pixels having any one of the predetermined number of gradation values among the plurality of pixels based on the correspondence information, and performing bit conversion of second pixels having any one of gradation values other than the predetermined number of gradation values among the plurality of pixels,
wherein the encoding of the image data is performed to generate position data indicating positions of at least any one of the first pixels and the second pixels, first data including data of coded values corresponding to the bit count in accordance with the predetermined number out of data of the coded values of the first pixels and data of the coded values of the second pixels, and second data including data of coded values other than the coded values corresponding to the bit count in accordance with the predetermined number out of the data of the coded values of the second pixels.

2. The recording medium according to claim 1, wherein the predetermined number is calculated based on respective data amounts in cases where the encoding of the image data is performed by extracting different numbers of gradation values.

3. The recording medium according to claim 1, wherein a predetermined number of gradation values includes a gradation value at which an occurrence frequency becomes highest and gradation values before and after the gradation value or a predetermined number of higher-order gradation values when gradation values having a high occurrence frequency are rearranged in a descending order are extracted as the predetermined number of gradation values.

4. An image processing apparatus, comprising:
a memory; and
a processor coupled to the memory and configured to:
specify occurrence frequencies of respective gradation values with regard to a plurality of pixels included in image data and represented by gradation values of a predetermined bit count,
extract a predetermined number of gradation values from a gradation value having a high occurrence frequency in a descending order;
generate correspondence information for performing bit conversion of the extracted gradation values into coded values of a bit count in accordance with the predetermined number; and
encode the image data by performing bit conversion of first pixels having any one of the predetermined number of gradation values among the plurality of pixels based on the correspondence information, and performing bit conversion of second pixels having any one of gradation values other than the predetermined number of gradation values among the plurality of pixels,
wherein an operation to encode the image data is performed to generate position data indicating positions of at least any one of the first pixels and the second pixels, first data including data of coded values corresponding to the bit count in accordance with the predetermined number out of data of the coded values of the first pixels and data of the coded values of the second pixels, and second data including data of coded values other than the coded values corresponding to the bit count in accordance with the predetermined number out of the data of the coded values of the second pixels.

5. An image processing method executed by a computer, the method comprising:
specifying occurrence frequencies of respective gradation values with regard to a plurality of pixels included in image data and represented by gradation values of a predetermined bit count;
extracting a predetermined number of gradation values from a gradation value having a high occurrence frequency in a descending order;
generating correspondence information for performing bit conversion of the extracted gradation values into coded values of a bit count in accordance with the predetermined number; and
encoding the image data by performing bit conversion of first pixels having any one of the predetermined number of gradation values among the plurality of pixels based on the correspondence information, and performing bit conversion of second pixels having any one of gradation values other than the predetermined number of gradation values among the plurality of pixels,
wherein the encoding of the image data is performed to generate position data indicating positions of at least any one of the first pixels and the second pixels, first data including data of coded values corresponding to the bit count in accordance with the predetermined number out of data of the coded values of the first pixels and data of the coded values of the second pixels, and second data including data of coded values other than the coded values corresponding to the bit count in accordance with the predetermined number out of the data of the coded values of the second pixels.

* * * * *